Patented Oct. 15, 1929

1,731,725

UNITED STATES PATENT OFFICE

WILLIAM BEACH PRATT, OF WELLESLEY, MASSACHUSETTS, ASSIGNOR TO DISPERSIONS PROCESS, INC., OF DOVER, DELAWARE, A CORPORATION OF DELAWARE

PROCESS OF DISPERSING RUBBER IN WATER

No Drawing.    Application filed December 6, 1924. Serial No. 754,432.

This invention has relation to water dispersions of water-insoluble bodies such as crude or reclaimed rubber or rubber compounds, balata, or gutta-percha.

In the process of dispersing crude rubber or crude rubber compounds, by incorporating therein a suitable organic or inorganic colloid and then incorporating water therein by a pulling, stretching or kneading operation, as more particularly described in my application Serial No. 657,803, filed August 16, 1923, each separated globule or particle of the original mass is provided with a protecting colloidal film. Dependent upon the character of the colloid, the protection thus accorded the dispersed rubber particles by the colloidal films in such that, if the dispersion is spread in a thin layer or film and then permitted to dry without elevated temperature or pressure, the resulting layer will often lose some of the charactertistics of the original mass, including tack, elasticity, softness and adhesiveness, as well as its water-proof qualities. This is due to the fact that the presence of the colloidal protective films about each globule or particle effectively separates them and prevents the formation of a cohesive or continuous layer or film of the dried dispersed body.

When a spread or painted layer or film of any of such dispersed body is thus dried in the absence of such heat and pressure as to rupture the protective colloidal coatings about the globules or particles and cause a coalescence of the dispersed globules or particles, the layer or film is partially reversible. Each colloidal coating, being usually hydrophilic, is capable of absorbing or taking up water, and consequently the layer or film is not waterproof, as compared with a like layer or film formed of a like body initially dissolved in an organic volatile solvent, and from which the solvent was permitted to evaporate.

It is frequently desirable, however, to use the water dispersion of rubber or rubber compound by spreading it, without the subsequent application of pressure or elevated temperature, in the formation of a thin layer or film which is not only waterproof when dry but which likewise possesses the same physical characteristics as the original body before dispersion. Thus, in the case of a water dispersion of crude rubber, it is highly desirable that the dried rubber layer or film should be tacky, adhesive, soft, elastic and continuous, so that two fabrics faced with such layers or films may be pressed into contact one with the other and properly adhere. These results, however, are only obtainable when the colloidal dispersing agent is of such character and is used in such amount or proportion to permit the rubber mass to be properly dispersed in globules or particles of the desired order of minuteness, as ordinarily the proportion of the colloid required for the proper dispersion of the water-insoluble body is such as to preclude the desired results.

In my investigations and research work in dispersing rubber or rubber compounds in water with the aid of many kinds of colloids, both organic and inorganic, such for example as soap, glue, albumen, saponin, soap bark extract, colloidal clay, including bentonite, wilkinite and the like, I have discovered that there are two distinct types of colloids which seem to react, one on the other, to throw down, precipitate, flocculate or destroy the functioning of such colloids as protective films or coatings. I have also found that there are many electrolytes which have a like effect upon colloidal solutions. Consequently, when two such colloids, or a colloid and such an electrolyte, are present, it is impossible to disperse effectively rubber or rubber compounds, which in the presence of one such colloid alone could be easily and effectively dispersed. For example, when colloidal clay and glue are both present in the plastic mass which one is attempting to disperse, their reaction on each other prevents the proper dispersion. The presence of aluminum sulphate, or tannin when colloidal clay is employed as the dispersing agent, has the same effect in preventing a proper dispersion of rubber or rubber compounds. Consequently I have always recognized the necessity of avoiding such combinations of colloids, or colloid and salt, in dispersing such bodies in water.

I have discovered further that while certain proportions of any given colloid may be necessary in the dispersing operation, nevertheless, once the dispersion has been effected, such proportion or amount of the colloid is not required to maintain the dispersion in a workable state. This is evidenced by the fact that by continued washing I am able, usually, to remove a large part of the colloid employed in effecting the dispersion, without deleteriously affecting or coagulating the product. But this washing operation is expensive and undesirable where large quantities of the rubber or rubber compounds are to be dispersed.

As a result of these observations and discoveries, I have further discovered that, when the mass has been properly dispersed by the employment of a suitable colloid in sufficient quantity or proportion to give the desired result, I can then by the addition of an antagonistic colloid or electrolyte, salt or water-soluble compound so affect the protective coatings, formed by the first-mentioned colloid about the dispersed globules or particles, that their stability is lessened without coagulating the mass, and consequently, when the dispersed body is spread in a thin layer and dried, the latter is coherent and possesses the desirable characteristics of a like dried layer formed of such water-insoluble body dissolved in a volatile solvent. Thus, in the case of crude rubber, for example, the layer or film is waterproof, coherent, adhesive, tacky and irreversible, and in these respects is substantially like a layer or film produced by first spreading like rubber dissolved in a volatile solvent and then removing the solvent.

In the practice of the process, I first disperse the plastic mass in water with the aid of a suitable water-carrying colloid. To illustrate, the crude rubber is preferably first worked on the usual rubber mill to warm it and increase its plasticity, and, during this operation, there is incorporated in the rubber mass 7½% (by weight) of wilkinite or colloidal clay, moistened if desired with water. At the same time there may also be incorporated in the mass any suitable compounding materials in proper proportion, such as sulphur, vulcanization accelerators, pigments or fillers and the like. The rubber mass is now transferred to a two-bladed mixer substantially like a dough mixer, say of the Werner and Pfleiderer or Ross or Day type (all of which are commercially well known), in which the mass is slowly kneaded, stretched and pulled, while water is being delivered slowly and gradually into the mixer. After a short time a paste is produced with water as the continuous phase or medium, in which the rubber globules are of the order of those in latex as to size, form and other characteristics (the other compounding materials, if present, being likewise dispersed). When this operation is completed, I now add to the mass 0.5% to 2.0% (proportional to the weight of the original colloid) of aluminum sulphate in solution, which is worked into the pasty mass. This has, at first, unless the salt is slowly added in a dilute solution, the appearance of thickening or coagulating the mass, but, on further kneading, the product smoothes out and has the same spreading properties as had the paste prior to the addition of the electrolyte. A layer or film of the resulting product has certain physical characteristics, which are markedly different from those of a layer or film formed from the dispersed rubber prior to the addition of the salt. If crude rubber only were dispersed, the layer or film on being dried is soft, tacky, and coherent. Water is not readily absorbed in the interglobular spaces, as the clay which was initially introduced seems to have lost its protecting function and appears to be present merely as discrete particles or an inert filler surrounded by rubber.

The resultant product may now be spread or painted in a thin layer or film, which on drying is continuous, coherent, irreversible and waterproof.

While I have described a specific method of initially dispersing crude rubber and have specified certain hydrophilic colloids as the dispersing agents, I do not mean to be limited in the practice of my process or in the production of the specific rubber product. I may employ any suitable, animal, vegetable or mineral colloid as the dispersing agent, in sufficient quantities to effect the desired dispersion, and then add any suitable agent which will react with the first-metioned colloid to impair its protective function to the desired extent, or to flocculate the colloid without coagulating the mass. Certain colloids or salts and many other chemical compounds have this property, and consequently it is not my intention to limit my invention to any specific agent, except as particularly specified in certain of the appended claims. So far as I am now aware, the agent should be either hydrophilic or water-soluble, though this may not necessarily prove to be the case. I have employed certain water-soluble salts of magnesium, aluminum, barium, zinc and various other metals, also a large number of water-soluble organic compounds which are generally classed as vulcanizing accelerators, certain caseins or glue (when colloidal clay is employed as the dispersing agent), and various other compounds which possess the desired function. Of course the electrolyte or equivalent agent should be selected, having in mind the character of the body to be dispersed, as, for example, it may not be desirable to employ with rubber certain salts containing chlorine.

The presence in the dispersion of the salt or other agent, which impairs the protecting function of the colloidal dispersing agent without coagulating the dispersed rubber mass, does not preclude the dilution of the mass by the addition of water thereto.

What I claim is:—

1. That process which comprises dispersing rubber in water with the aid of a suitable colloidal agent, by which the dispersed particles of rubber are protected by such colloidal agent, and then incorporating in the resulting product a flocculating agent in amount sufficient to impair materially the protecting function of such colloidal agent but without coagulating the rubber mass.

2. That process which comprises dispersing a coagulated rubber mass in water with the aid of a suitable dispersing agent which affords a protecting coating for the dispersed rubber particles and then incorporating in the resulting product a flocculating agent in amount sufficient to impair materially the function of such colloidal agent but without coagulating the rubber mass or impairing its spreading properties.

3. That process which comprises dispersing a coagulated rubber mass in water with the aid of a suitable dispersing agent which affords a protecting coating for the dispersed particles and then incorporating in the resulting product a flocculating agent in amount sufficient to react with such colloidal agent sufficiently to permit the dispersed rubber product to be spread in a layer, which when dry is tacky, coherent and irreversible.

4. That process which comprises dispersing a coagulated rubber mass in water with the aid of a suitable colloidal agent, by which the dispersed rubber particles are protected by such colloidal agent, and incorporating in the resulting product a soluble salt in amount sufficient to impair materially the protecting function of such colloidal agent but without causing a re-coagulation of the mass.

5. An uncoagulated uniform water dispersion of rubber, comprising uncoagulated colloid-protected particles of globules of rubber dispersed in the water, together with an agent by which the colloid is flocculated, whereby when the said dispersion is spread in a thin film and dried such film is continuous and irreversible.

In testimony whereof I have affixed my signature.

WILLIAM BEACH PRATT.